United States Patent [19]
Culp

[11] Patent Number: 5,327,038
[45] Date of Patent: Jul. 5, 1994

[54] WALKING EXPANSION ACTUATOR

[75] Inventor: Gordon W. Culp, Van Nuys, Calif.

[73] Assignee: Rockwell International Corporation, Seal Beach, Calif.

[21] Appl. No.: 807,667

[22] Filed: Dec. 16, 1991

Related U.S. Application Data

[63] Continuation-in-part of Ser. No. 697,368, May 9, 1991, abandoned.

[51] Int. Cl.$^5$ .................. H02N 10/00; F04B 19/24
[52] U.S. Cl. .............................. 310/306; 60/911; 417/52
[58] Field of Search ............ 310/306, 307, 316, 317, 310/323, 328; 60/516, 531, 910, 911; 417/52

[56] References Cited

U.S. PATENT DOCUMENTS

| | | | |
|---|---|---|---|
| 3,757,146 | 9/1973 | Love | 310/4 |
| 3,898,017 | 8/1975 | Mandroian | 417/65 |
| 4,703,215 | 10/1987 | Asano | 310/328 |
| 4,928,030 | 5/1990 | Culp | 310/328 |
| 5,017,820 | 5/1991 | Culp | 310/328 |

OTHER PUBLICATIONS

Lamb et al, Integrated-Circuit Broadband Infrared Sources, Mar. 1989, NASA Tech Briefs, p. 32.

Chin, Gas Flow Sensor Fabricated on Silicon Chip, Oct. 1984, Electronic Products, pp. 29–31.

Primary Examiner—Steven L. Stephan
Assistant Examiner—D. R. Haszko
Attorney, Agent, or Firm—H. Fredrick Hamann; Harry B. Field; Steven E. Kahm

[57] ABSTRACT

This invention is for an object moving actuator composed of a stack of independently controllable layers which convert thermal exobaric pulses into mechanical motion. Each layer can be a lifter for moving the stack normal to the object to be moved or a tangenter for moving the stack tangentially to the object. Each layer has a plurality of chambers having a heat source and a thermal expansive material contained therein. The heat source is controlled by a controller to generate a heat pulse which expands the thermal expansive material thereby moving a rolling barrier to make the layer move normally or tangentially. Preferably two pair of actuator stacks work together to alternately engage and move the object. The first pair makes contact with the object by lifter motion and moves the object by tangenter motion while the second pair is lifted off the object and retraces to get into position to contact and translate the object. When the actuator engages the object at the same speed the object is moving so that no frictional rubbing occurs, smooth walking motion is achieved.

44 Claims, 4 Drawing Sheets

WALKING EXPANSION ACTUATOR

This is a continuation-in-part of copending application Ser. No. 07/697,368 filed on May 9, 1991, now abandoned.

BACKGROUND OF THE PRESENT INVENTION

Applicant's U.S. Pat. No. 4,928,030 teaches two- and three-axis piezoelectric actuators that position an object such as a rod or motor shaft by walking traction, A lifter piezoelectric actuator portion positions the actuator's traction member perpendicular to the object's surface. A tangenter piezoelectric actuator portion positions the actuator's traction member tangential to the object's surface. Lifter and tangenter portions of an actuator are integrally constructed and independently electrically controllable. Cyclical coordinated lifter and tangenter actions can cause the traction member to walk the object's surface in a smooth walking manner. A smooth walking cycle operation consists of activating the lifter to apply a predetermined normal force between the traction member and the object while the tangenter translates the traction member at a speed equal to the surface speed of the object. During smooth walking application and removal of normal force, no mechanical work is done by the traction member on the object. As the normal force is applied, a tangential strain is added to the tangenter portion. The product of the tangential force and the tangential distance traveled during the power stroke portion is the work done on the object. At the end of the power portion of the cycle the tangential strain is removed as the normal force is removed by the lifter, still maintaining zero relative speed between object and traction member. After the traction member leaves the object's surface, the traction member retraces, that is, it reverses tangential stroke direction and changes speed until the opposite extreme tangential position is reached, thereby preparing for a new stroke. This is a smooth walking cycle because sliding is avoided.

Actuators execute walking cycles in pairs, one actuator performing a power stroke while the other retraces. A predetermined coordinated positioning of the traction members of both actuators results in smooth walking. Smooth walking as defined in applicant's U.S. Pat. No. 4,928,030 is uninterrupted and smooth tractional power transmission without sliding.

The piezoelectric materials described in U.S. Pat. No. 4,928,030 are generally electrically polarized ferroelectric ceramics, This class of materials is relatively brittle, having relatively little tensile strength. In addition, the temperatures above and below the usual room temperature at which electrical polarization is irreversibly lost, usually called the Curie temperatures, are relatively low. These physical properties are a detriment in some applications of walking actuators. U.S. Pat. No. 4,928,030 also teaches the use of relatively high applied voltages to achieve desirably large mechanical strokes. High voltages are a disadvantage in the context of solid state electronic drive devices, such devices having evinced more efficient operation with low voltages with relatively large currents.

Applicant's copending patent application Ser. No. 07/488,548 filed Mar. 5, 1990 teaches the use of Fourier generation of non-sinusoidal mechanical wave forms needed for smooth walking. The teachings are primarily directed toward piezoelectric actuators, but are also directed toward actuators that function in a manner similar to piezoelectric ones but use other known actuator forces. This method allows partial compensation for nonlinear transducer action by operations in the time domain, for example, adjusting phases of stimuli.

Applicant's present invention is to replace the electrodeformable tangenter and lifter layers of the prior art with thermoexpandable layers of lifters and tangenters and to emulate their positioning capabilities. The thermoexpandable actuators use mechanical Fourier addition of the layers for positioning the actuators.

OBJECTS OF THE INVENTION

The primary object of the present invention is a smooth walking expansion actuator relying on heating thermoexpansive materials to provide the actuator forces needed to position an object in one or more directions by traction. The positioning being limited only by the extent of the object's traction surface and not by the mechanical stroke length of an electrodeformable actuator.

Other objects are:

to impart relatively large forces at moderate speeds to a positioned object;

to independently electrically control the force and speed of positioning;

to forcefully position an object without bearings or springs, with relatively great precision, and with relatively few life-shortening mechanisms;

to forcefully position an object in a rotary direction, in rotary directions about two axes, in a linear direction, in two angularly disposed linear directions, in rotary directions about three axes, and in combinations of linear and rotary directions by simultaneous independent electrical control of multiple angularly disposed actuator action directions;

to forcefully position an object in a vacuum without lubricants, without lubricant seals, and without contaminating the vacuum;

to operate in space and a diverse class of chemically and radiationally deleterious environments;

to forcefully position an object using moderate voltages;

to forcefully position an object in intense magnetic fields;

to forcefully position an object in a relatively broad temperature range;

to position an object with structural rigidity comparable to a solid apparatus;

to position an object in a micro- and in a zero-gee environment using normal tractive forces supplied by the actuators without external normal forcing means;

to operate with relatively high energy density by means of forced convention cooling;

to operate with relatively high energy density by means of heat pipe cooling;

to provide an actuator manufacturing method resulting in relatively high positioning energy density through microminiaturization of actuator components;

to provide an actuator having no ohmic contacts, and no commutators;

to operate using a combination of gas, liquid, solid, and vaporizable expansion materials;

to scale actuator size from relatively small to very large in accordance with a large class of prime mover applications;

to operate at relatively high energy density using forced fluid convection cooling through channels internal to actuator components, also allowing vacuum and space operation without exposure or loss of coolant;

to operate in intense ionizing radiation with relatively long life and little nuclear transmutation;

to be constructed with relatively light weight materials;

to operate with relatively high electrical efficiency by means of pulsatile excitation;

to operate with high electrical efficiency in combination with Fourier stimulation;

to operate with relatively high mechanical efficiency by means of smooth walking; and to operate with relatively high system efficiency by smooth walking combined with Fourier stimulation.

DETAILED DESCRIPTION

The present invention is directed toward prime mover actuators in general, and particularly toward walking actuators with relatively high electrical and mechanical efficiency, relying on electric current heating in combination with expansive materials to provide multi-axis forceful actuator motions.

Figure 1:
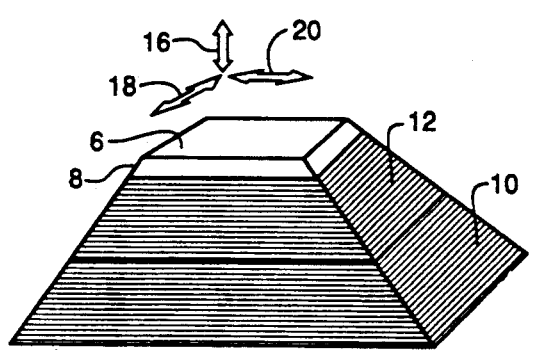
FIG. 1 is a perspective view of a walking expansion actuator having a layered body and a traction member.
Figure 2:
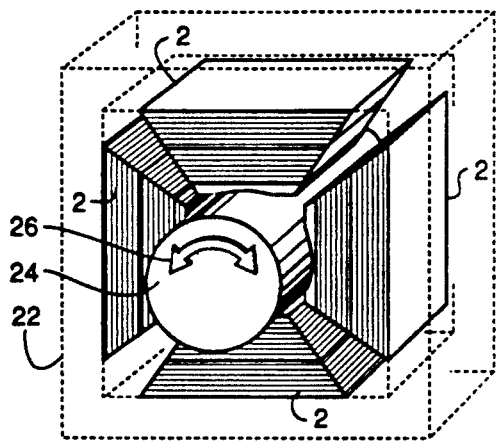
FIG. 2 is a perspective partially ghosted view of a rotary motor application of the present actuator.
Figure 3:
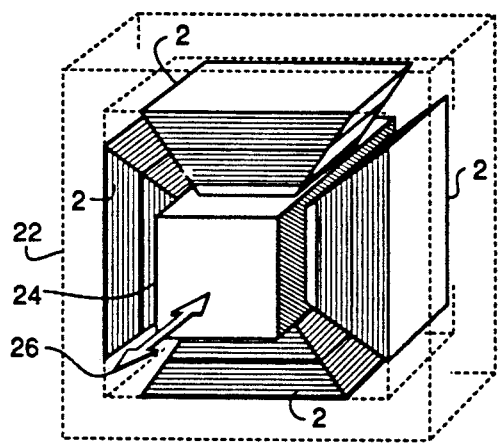
FIG. 3 is a perspective partially ghosted view of a linear actuator application of the present actuator.

FIGS. 1 through 3 illustrate examples of actuators employing expansive materials. Actuator layer structure is indicated in the figures by parallel lines.

Referring to FIG. 1, shown is a perspective view of a two-axis actuator generally indicated 2, comprising a mounting base surface portion 4, a traction surface portion 6 of traction member 8, and layered actuator body portions 10, 12. The body portions forcefully position traction surface 6 in predetermined directions in response to applied electric currents (connections omitted for clarity). Body portion 10 causes positioning of traction member 8 in direction 16 and is hereinafter referred to as a lifter. Body portion 12 positions traction member 8 in tangential direction 18 and is hereinafter referred to as a tangenter. A further body portion, if included, could act in direction 20 and be called an axier. As can be seen in FIG. 3 an axier can replace the tangenter. Many combinations of lifters, axiers and tangenters are possible in an actuator. Traction member positioning directions 16, 18, and 20 may be orthogonal, and alternatively may act along predetermined relative angular directions. Body portions having curved layers (see FIGS. 23 to 28) position an object along a circular arc segment.

Referring to FIG. 2, transparently illustrated is a rotary motor application of the two-axis walking actuator, comprising shaft 24 and two pair of actuators 2 of FIG. 1 affixed to housing 22 by their respective mounting bases 4 (FIG. 1). As explained later herein in greater detail a predetermined set of electrical signals sent to the actuator body portions 2, cause shaft 24 to rotate in directions 26. Actuator pairs alternately and cyclically position and retrace on the shaft surface in a walking motion. Coordinated activation of lifters and tangenters cause the shaft to rotate about its axis. The normal force of traction is supplied solely by lifter layers 10. The tangenter layers 12 supply the force to rotate the shaft 24. The layers of lifters 10 and tangenters 12, as will be shown herein, transduce electrical or chemoelectric energy to mechanical power.

Referring to FIG. 3, partially transparently shown is a linear actuator comprising four two-axis actuators 2, of FIG. 1 except that the tangenter 12 is rotated 90 degrees to become an axier, affixed to housing 22 and positioning shaft 24 in directions 26 in response to predetermined electrical stimuli applied to the actuator lifters 10 and axiers. All layers in this particular embodiment are planar.

Actuator body portions may comprise combinations of single and multiple layers of axiers, tangenters and lifters. Boundaries between body portions may have a common layer member, also called a sheet, and alternatively, each layer may have two sheets.

Figure 4:
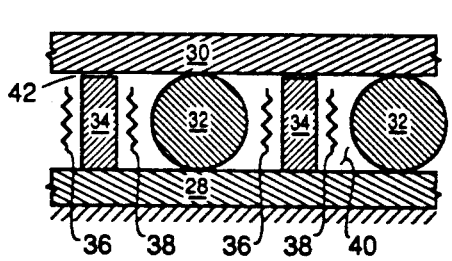
FIG. 4 is an at rest cross sectional view of a portion of one layer of an embodiment of a bidirectional tangentially forcing actuator.

Referring to FIG. 4, shown is a cross sectional portion view of one tangenter body layer comprising stationary sheet 28, moving sheet 30, rolling components hereinafter referred to as rolling barriers 32, electric heaters 36, 38, and fixed barriers 34 affixed to sheet 28. The components of this embodiment may be made of nonmagnetic materials. The rolling barriers 32, of this embodiment are cylinders. The rolling barriers are compressed between sheets and allow controlled relative sheet movement in one direction by traction. Heaters may be periodically supported (supports omitted for clarity) strips running parallel to and essentially the same length as the rolling barriers and the fixed barriers. The heaters preferably have a large surface area to volume ratio.

Figure 5:
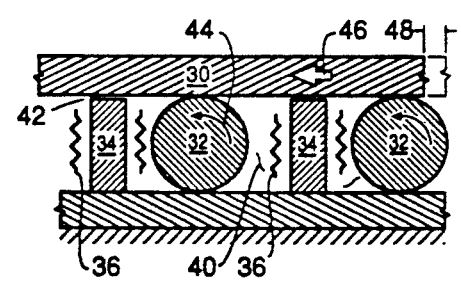
FIG. 5 is a depiction of FIG. 4 after a tangential positioning.

Referring to FIG. 5, shown is the apparatus of FIG. 4 after a tangenter stroke has been made. Expansive material 40, trapped between rolling barriers 32, sheets 28, 30 and fixed barriers 34 has been thermally expanded by heaters 36 after a pulse of electric current. The expansion pressure causes rolling barriers 32 to rotate in direction 44, and by roller traction, to forcefully position sheet 30 in direction 46 by mechanical stroke 48. Heaters 38 are quiescent in FIG. 4. The force-motion product per unit time is the mechanical power supplied to sheet 30. The expansive material is trapped by the contact between sheets and rolling barriers 32. There is a small predetermined clearance 42 between the fixed barriers 34 and sheet 30. Clearance 42 allows sheet 30 to translate without rubbing. After a predetermined cooling interval, the expansive material surrounding heaters 36 approaches its normal volume at the prevailing temperature. Upon cooling, sheet 30 may return to the quiescent position. Alternatively, application of a similar electrical pulse to heaters 38 forcefully positions sheet 30 in a direction opposite 46. Therefore the illustrated tangenter, depicted in FIGS. 4 and 5, is bidirectional when heater sets 36 and 38 are alternately activated. The embodiment as depicted in FIGS. 4 and 5 are intended for compressible expansive material such as gases and combinations of gas and liquid.

Figure 24:
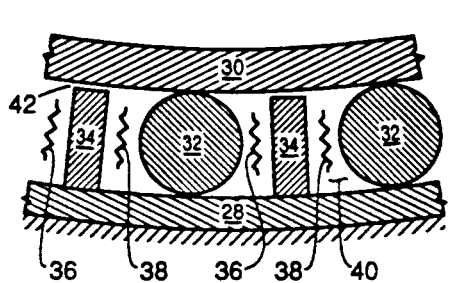
FIG. 24 is a cross section view of a portion of one layer of a bidirectional tangentially forcing actuator with curved sheets for providing curved motion.
Figure 25:
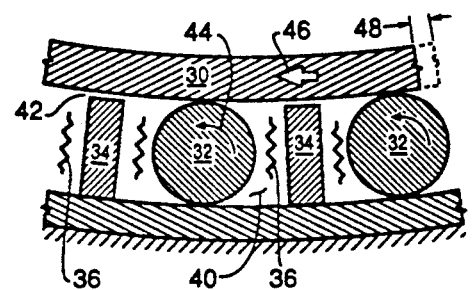
FIG. 25 is a depiction of FIG. 24 after tangential positioning.

A tangenter may be planar or curved in accordance with the path to be taken by the traction member of the actuator. The tangenters of FIGS. 4 and 5 are shown with flat sheets. The tangenters of FIGS. 24 and 25 are the same as those of FIGS. 4 and 5 except they employ curved sheets for executing power strokes along the curved surface of a positioned object such as a motor shaft.

Figure 6:
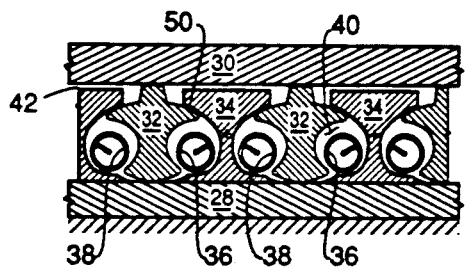
FIG. 6 is an at rest cross section view of a portion of one layer of an embodiment of a bidirectional tangentially forcing actuator having reduced expansion volume and cycloidal seals.
Figure 7:
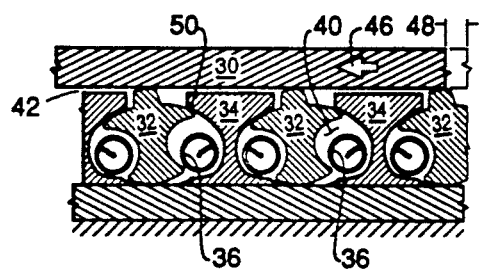
FIG. 7 is a depiction of FIG. 6 after a tangential positioning.

Referring to FIG. 6, shown is a cross sectional portion of a bidirectional tangenter comprising stationary sheet 28, forcefully positioned sheet 30, rolling barriers 32, heater sets 36 and 38, and fixed barriers 34. The latter are affixed to stationary sheet 28 and incorporate cycloidal sealing surfaces 50 that have predetermined small clearances with proximate cycloidal surfaces of rolling barriers 32. Heaters are indicated round, having coiled or coiled coil shape preferred for particular applications. The enclosed volumes surrounding the heaters are filled with expansive material 40. Referring to FIG. 7, shown is the apparatus of FIG. 6 after the execution of a tangential half stroke. Heater set 36 has received an electrical pulse that heated expansive material 40, caused rolling barriers 32 to rotate and translate, and by roller traction, resulted in forceful positioning of sheet 30 in direction 46 by mechanical stroke 48. After cooling, pulsing heater set 38 causes a tangential forceful stroke in the direction opposite 46. Seal 50 does not rub when the geometry of the depicted embodiment is intended to operate with relatively great electromechanical efficiency. This embodiment is intended for compressible expansive material. Leakage past cycloidal seal 50 is in part further inhibited by a predetermined small clearance between fixed barriers 34, and sheet 30.

Figure 8:
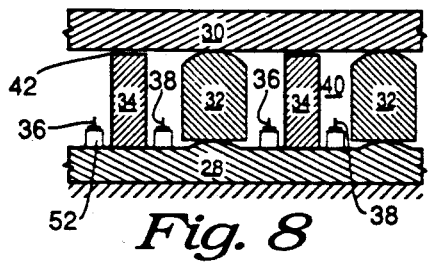
FIG. 8 is an at rest cross section view of a portion of a bidirectional tangential actuator layer where the rollers have flat bottoms and cylindroidally convex upper surfaces.

Referring to FIG. 8, shown is a cross sectional portion of a bidirectional tangenter layer intended to be fabricated by micro-machining, comprising stationary sheet 28, forcefully positioned sheet 30, rolling barriers 32, fixed barriers 34, heater supports (mesas) 52, and heater sets 36 and 38. Fixed barriers 34 are affixed to sheet 28. Sheet 28 has cylindroidally convex portions on its upper surfaces on which rolling barriers 32 operate. Rolling barriers 32 have flat bottoms and cylindroidally convex upper surfaces with which to roll on sheet 30.

Figure 9:
FIG. 9 is a depiction of FIG. 8 after a tangential positioning.

Referring to FIG. 9, shown is the apparatus of FIG. 8 after execution of a forceful tangential stroke. Application of a predetermined electrical pulse to heater set 36 has heated the expansive material 40, caused expansion that resulted in rollers 32 to roll in direction 44, and by traction, has forcefully positioned sheet 30 in direction 46 by half mechanical stroke 48. After cooling, pulsing heater set 38 causes a half stroke in the direction opposite 46. Alternate pulsing of heater sets 36 and 38 cause bidirectional tangential forceful positioning of sheet 30. When the expansive material portions 40 expand and rolling barriers roll, the expansive material on opposite sides of the rolling barriers must compress. Therefore, this embodiment is intended for compressible expansion materials. Leakage from volume 40 is inhibited by the predetermined small clearance 42. Relatively high electromechanical efficiency obtains when clearance 42 does not rub during operation.

Figure 10:
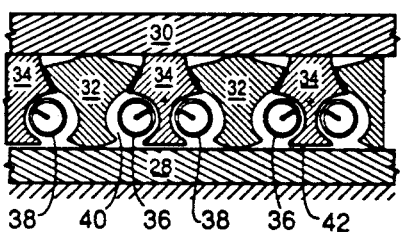
FIG. 10 is an at rest cross section view of a portion of one layer of an embodiment of the actuator having reduced expansion volume and inverted cycloidal seals.

Referring to FIG. 10, shown is a cross sectional portion view of an embodiment of a bidirectional tangenter comprising stationary sheet 28, forcefully positioned sheet 30, rolling barriers 32, fixed barriers 34, heater set 36, and heater set 38. The fixed barriers are affixed to sheet 30. The heaters are affixed to the barriers or to the sheet 30 and move with sheet 30. The volumes around heaters contain compressible expansive material 40.

Figure 11:
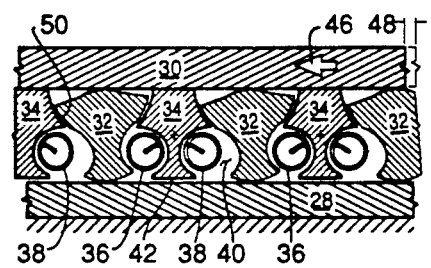
FIG. 11 is a depiction of FIG. 10 after a tangential positioning.

Referring to FIG. 11, shown is the apparatus of FIG. 10 after execution of a half tangential stroke. The expansive material 40 around heater set 36 has been expanded by heat from an electrical pulse, causing rolling barriers 32 to roll, and by traction, to have forcefully positioned sheet 30 in direction 46 by mechanical half stroke 48. Cycloidal seals 50 and barrier gaps 42 inhibit leakage of expansive material during heat pulses. After cooling, pulsing heater set 38 causes a half mechanical stroke opposite to direction 46. Having fixed barriers 34 attached to sheet 30 reduces relative movement of members forming seal 50 compared to the embodiment of FIG. 6. In addition, seal 50 provides a somewhat longer length of leakage path.

Figure 22:
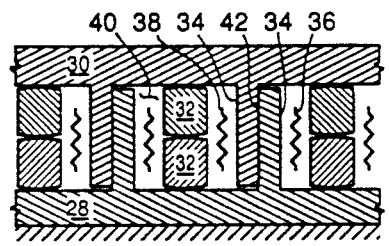
FIG. 22 is a cross section view of a portion of a lifter having one rolling barrier and one fixed barrier.

Referring to FIG. 22, there is shown a cross sectional portion of a lifter layer comprising a rolling barrier 32, a fixed barrier 34, stationary sheet 28, forcefully positioned sheet 30, and heater sets 36, 38. The rolling barrier is a pair of rollers. The volumes between roller pairs are filled with compressible expansive material 40. Nonrubbing barrier gaps 42 inhibit escape of compressible expansive material. Alternate activation of heater sets 36, 38 produce similar lifter strokes when rolling barriers are symmetric.

Figure 12:
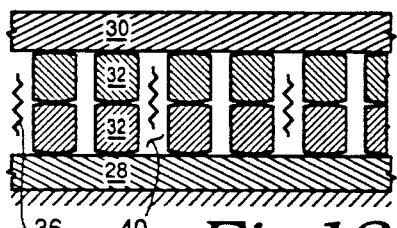
FIG. 12 is an at rest cross sectional view of a portion of a single-circuit lifter showing heaters and rolling components.

Referring to FIG. 12, shown is a cross sectional portion of a lifter layer of the present actuator, comprising stationary sheet 28, forcefully positioned sheet 30, rolling barrier 32, and heater sets 36. The rolling barrier is a pair of rollers. The volumes between roller pairs are filled with compressible expansive material 40.

Figure 13:
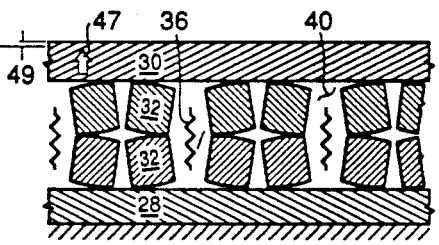
FIG. 13 is a depiction of FIG. 12 after executing a lift.

Referring to FIG. 13, shown is the apparatus of FIG. 12 after execution of a lifter stroke. Heaters 36 have heated expansive material 40 that caused roller pairs 32 to roll. Curvature of each roller is greater than that of a true cylinder that fits the same space. Rolling of a roller pair causes sheet 30 to translate in direction 47 by lifter stroke 49. The shape of roller convex surfaces determines the mechanical advantage of the rolling motion relative to the pressure exerted by expanding expansive material. Compressible expansive material is used because material between rolling barrier roller pairs in which no heater is located have a smaller volume during execution of lifter strokes.

Figure 14:
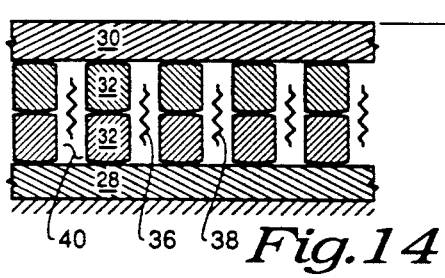
FIG. 14 is a cross sectional view of a portion of a dual-circuit lifter showing heaters and rolling components.

Referring to FIG. 14, shown is a cross sectional portion of a lifter layer of the present actuator, comprising stationary sheet 28, forcefully positioned sheet 30, rolling barrier roller pairs 32, heater set 36, and heater set 38. The volumes between roller pairs are filled with compressible expansive material 40.

Figure 15:
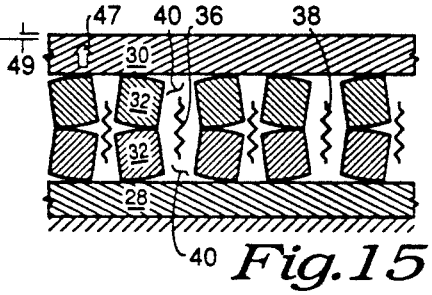
FIG. 15 is a view of FIG. 14 after executing a lift.

Referring to FIG. 15, shown is the apparatus of FIG. 14 after execution of a lifter stroke. Heaters 36 have heated expansive material 40 that caused roller pairs 32 to roll. Heater set 38 is quiescent. The curvature of each roller is greater than that of a true cylinder that fits the same space. Rolling of a roller pair causes sheet 30 to translate in direction 47 by lifter stroke 49. The shape of roller convex surfaces determines the mechanical advantage of the rolling motion relative to the pressure exerted by expanding expansive material. Compressible expansive material is used because expansive material between roller pairs having quiescent heaters has a smaller volume during execution of lifter strokes. Alternating pulsing of heater sets repeats like lifter strokes when rollers are symmetric. Alternating pulsing in this two-circuit embodiment allows cooling during half of each operating cycle. Asymmetric rollers (not illustrated) produced alternating dissimilar lifter strokes.

Figure 23:
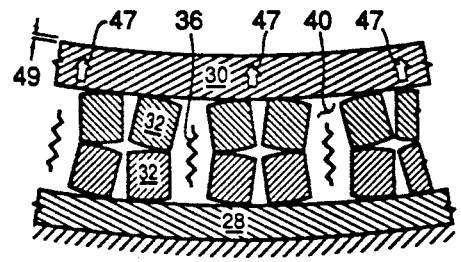
FIG. 23 is a cross section view of a lifter with curved sheets executing a lifting motion.

The lifter of FIG. 13 is also shown in FIG. 23 with curved sheets 28 and 30 as an example of the variant used to position a traction member along a curved path. An application of the curved lifter is in a hydrostatic or hydrodynamic bearing having electrically and dynamically controlled lubricant film thickness. Upper sheet 30 lies proximate the curved surface of a rotating shaft and confines the lubricating fluid. Film thickness is decreased as the lifter lifts, causing sheet 30 to move radially toward the shaft in directions 47, entailing a sheet translation and a change in curvature of the sheet. Radial movements 47 converge on the shaft axis in this embodiment.

Figure 16:
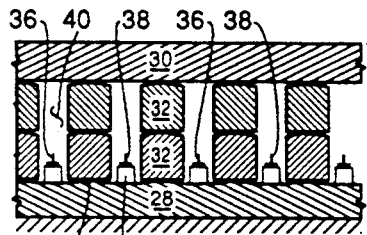
FIG. 16 is a sectional view of a portion of a dual-circuit lifter intended for micro-fabrication.

Referring to FIG. 16, shown is a lifter embodiment intended for micro-machining, comprising stationary sheet 28, forcefully positioned sheet 30, rolling barrier roller pairs 32, heater supports (mesas) 52, and heater sets 36, 38. Sheet 28 has an upper surface incorporating convex cylindroidal segment rolling surfaces 54 on which the lower roller rolls. Rollers 32 have flat lower surfaces and convex rolling upper surfaces. The volumes between roller pairs are filled with compressible expansive material 40.

Figure 17:
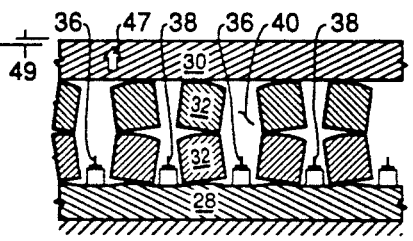
FIG. 17 is a depiction of FIG. 16 after executing a lift.

Referring to FIG. 17, shown is the apparatus of FIG. 16 after executing a lifter stroke. Heater set 36 has heated the expansive material 40 after an electrical pulse. Heater set 38 is quiescent. Pressure of expanding material has caused rolling barrier roller pairs 32 to roll, and by traction, resulted in the forceful positioning of sheet 30 in direction 47 by lifter stroke 49. Alternating pulsing of heater sets produces like lifter strokes when rollers are symmetric.

Figure 18:
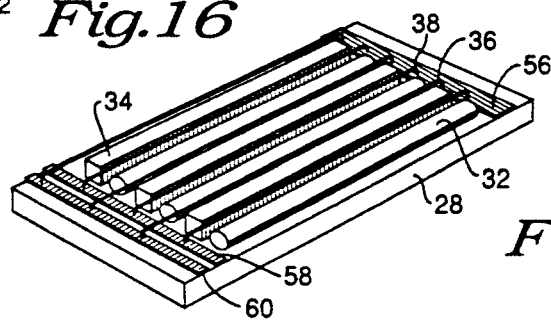
FIG. 18 is a perspective view of a portion of a tangenter layer showing rolling components and heaters.

Referring to FIG. 18, shown is a perspective view of a portion of a tangenter layer, comprising stationary sheet 28, rolling barriers 32, heater sets 36, 38, and fixed barriers 34 (sheet 30 omitted for clarity).

The heaters are connected to a common bus 56, and respectively to feeder buses 58, 60. Heater segments of a set are shown connected in electrical parallel for applications requiring relatively low drive voltages, particularly those embodiments having heaters the segments of which have relatively high resistance, for example, long and thin segments. Other applications requiring relatively high voltage drive benefit from series-parallel or series connected heater segments. Not shown in the figure are end seals. Heater supports and barrier ends lie on a line and have accurately aligned side planes proximate end seal surfaces. Low pressure and vacuum applications of the actuator use flexible seals along all sheet edges to confine the expansive material. Heater connections (not illustrated) pass through sheets, and alternatively pass through sealing feedthroughs at sheet edges.

Figure 19:
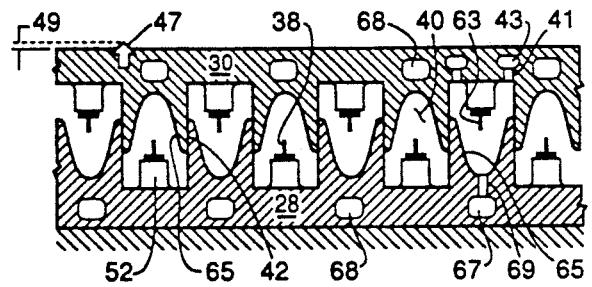
FIG. 19 is a cross section view a portion of a lifter intended for forced convection cooling, solid expansion materials and micro-fabrication.

Referring to FIG. 19, shown is a portion cross section of a lifter embodiment primarily intended for solid expansive materials comprising stationary sheet 28, forcefully positioned sheet 30, heater supports 52, and heaters 38. Sheets have extensions 65 that divide the space between sheets into compartments filled with expansive material 40. Each extension is provided with one or more interior forced convection cooling channels 68.

Figure 20:
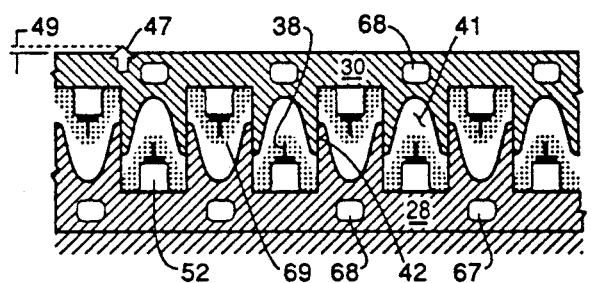
FIG. 20 is a cross section view of a portion of a lifter intended for state-change heat pipe operation.

Referring to FIG. 20, shown is a portion cross section of a lifter embodiment similar to FIG. 19 but primarily intended for vaporizing liquid expansive materials. Heaters 38 are immersed in expansive liquid by capillary action of the surrounding wicks 69. Heat pulses change liquid to vapor. After the vapor pressure has positioned sheet 30 by forceful stroke 49, it recondenses in wicks 69. Excess heat in vapor form is carried to sheet edges via spaces 41, or to edge cooling channels.

Referring to FIG. 19, in addition to the components previously described, the following components may be used for operating the invention using chemical reactions and catalysts. A catalytic coating 63 may be placed on the heater element 38. A catalytic coating 65 may be placed on the surfaces of cavity 40. Fluid ingress manifolds 43 and fluid ingress ports 41 are used for introducing a chemical to the chamber. Fluid egress port 69, and fluid egress duct 67 exhaust chemicals after the chemical reaction. A fluidly closed variant similar to FIG. 19 with catalysts 63, 65, but without fluid circulation, may use a single fluid that produces exobaric pulses responsive to heater temperature and catalytic action that urges a state change of fluid 40 to one of greater volume with increasing temperature. By way of example, a polyatomic molecular species of fluid is temporarily dissociated by the concerted action of heater heat, heater radiation (primarily infrared), and catalysts. The exobaric dissociation contributes a pressure pulse portion to the pressure pulse portion produced by fluid heating. The preferred fluid and reaction is reversible wherein the catalyst or catalysts, over the relatively greater time span between pulses, and at a lower temperature, favors recombination of the dissociated constituents into the parent fluid, thereby allowing fluidly closed operation.

A fluidly open embodiment using all of the components of FIG. 19 converts two or more fluids (from ports, typically port 41, mixed in cavity 40) by catalytic heater 63 to exobaric energy. The combined action of heater heat, the enhanced activation of mixed fluids by catalytic heater coating 63 by said heat, the enhanced activation of catalytic coating 65 of surfaces of cavity 40 by heater radiation in combination with any radiation emitted by the reaction, the action of the catalysts on the mixed fluids, all contribute to the chemoelectric conversion of the mixture to heat, to one or more species of chemical by-products, and to pressure pulses that are converted to useful mechanical work in the process of, in this example, lifter action.

Embodiments having irreversible catalytic reactions generate by-products that exit cavity 40 via a port, typically port 69, and ducts 67, the ducts having a lower pressure (e.g., vented to space) or by dint of the pressure of replacement fluid or fluids from ingress ports 41. By way of example of a two-fluid actuator, a first fluid may be hydrocarbons such as methane or a mixture of carbon-bearing gases, and a second fluid may consist of one or more oxidizers such as air or oxygen, that upon mixing and being activated by the catalyst, "crack" to form hydrogen that reacts with the oxidizer to form exobaric by-products that may include steam.

Practice of catalytic and chemoelectric embodiments of the present invention includes sizing fluid ingress ducts and controlling the flow of admitted fluids in a manner prescribed to restrict, as a minimum, chemoelectric reaction to the immediate vicinity of the catalytic surfaces, and as a maximum, to the immediate vicinity of the heater cavity, because chemoexobaric excitation elsewhere contributes relatively little to the intended conversion of chemoelectric energy to desired mechanical work. The control of pressure and flow in ports 41 precludes mixing in any but the aforementioned desired locations. Port pressure and flow control depends in part on the accuracy with which fluid passages are made. The preferred methods of making variants, particularly the described catalytic variants of the present invention, provide improved accuracy of fluid passage configuration. The preferred methods include but are not limited to epitaxial material transfer of substrate, fluid cavity, fluid passage, heater, electrical insulator, electrical power distribution conductors, and extension of electrical and fluid circuits to device external surfaces.

Clearly, the energy density available from chemoelectric exobaric conversion exceeds the energy density produced by solely temporarily raising the temperature of the working fluid. In fluidly open embodiments of the present invention, the cyclical manner of operation provides the time needed between exobaric pulses for the replenishment of reactive fluids and the expulsion of fluid reaction products, because a greater number of heaters is provided for any given actuator layer than are needed for a prescribed applied force.

It is emphasized that the mechanical work provided by the catalytic and chemoelectric embodiments herein described is the sum of the chemical exobaric contributions, and the previously described thermal contributions due to electrical pulsatile heating of the working fluid or fluids, any of which may contribute an equal or preponderant portion of the work in accordance with the particular embodiment and prescribed operating conditions.

One catalyst which can be used in this embodiment is porous silver. One fluid which can be used is hydrogen peroxide.

Figure 26:
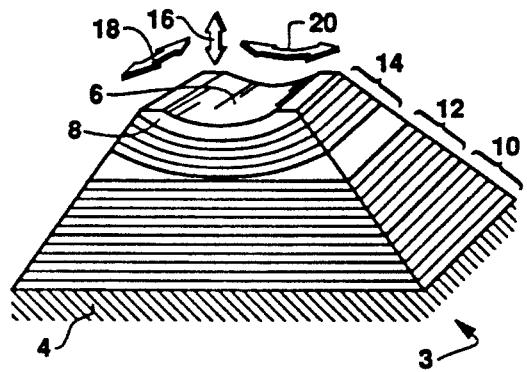
FIG. 26 is a perspective drawing of the actuator having a layered body and a traction member.

FIG. 26 shows a perspective view of a 3-axis actuator generally indicated 3 comprising a mounting base surface portion 4, a traction surface portion 6 of traction member 8, and layered actuator body portions 10, 12 and 14. This embodiment is the same as that shown in FIG. 1 except it has an additional curved layered body portion 14. Electrical connections are omitted for clarity. The traction member and body portions may be integrally constructed. The actuator forcefully positions traction surface 6 in predetermined directions when separate electric signals of predetermined magnitude and polarity are applied to corresponding body portions. Body portion 10, a lifter, causes positioning of traction member 8 in direction 16. Body portion 12, an axier, positions traction member 8 in direction 18. Body portion 14, a tangenter, acts in directions 20 along a curved path. A layered body structure is indicated in the figure by parallel lines.

Preferred embodiments have many layers of a body portion, layers being connected in electrical parallel but producing mechanical action that is the sum of the motional contributions of the layers of the portion. Each actuator portion, relative to mounting surface 4, adds its sum motion to the motions of each successive body portion. The traction surface of member 8 is curved to fit the surface of a positioned object, and moves with the vector sum of motions of all layers of the actuator. Traction member positioning directions 16, 18, and 20 may be orthogonal linear or curved paths, and alternatively may act along predetermined relative angular directions.

Figure 27:
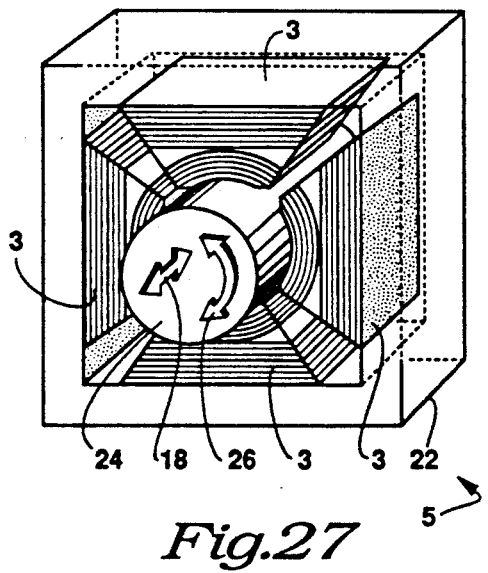
FIG. 27 is a perspective partially ghosted view of a 2-axis motor application of the present invention.

Referring to FIG. 27, shown is a partially ghosted perspective view of a positioner assembly 5 comprising housing 22, actuators 3 similar to those shown in FIG. 26, and a shaft 24. Activations of lifters (10 of FIG. 26) force traction members against shaft 24. Tangenters (14 of FIG. 26) cause shaft 24 to rotate in directions 26. Axiers (12 of FIG. 26) cause shaft translation in directions 18.

Figure 28:
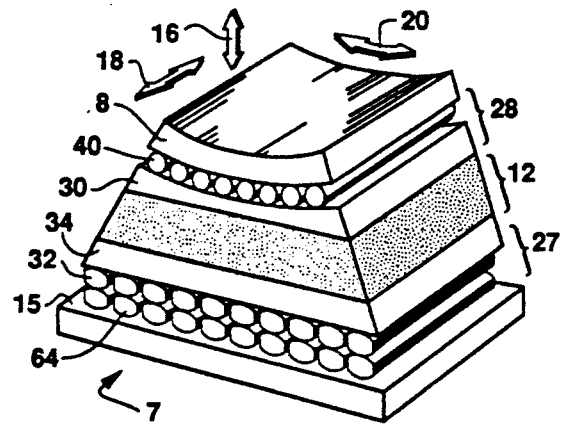
FIG. 28 is perspective drawing of a 3-axis hybrid actuator having a thermal transducer, a piezoelectric axier and a thermal lifter.

Referring to FIG. 28, shown is a perspective view of a three-axis hybrid actuator 7 comprising base 15, traction member 8, tangenter 28, axier 12, and lifter 27 having roller pairs 92. Traction member 8 is positioned respectively in directions 20, 18 and 16 by tangenter 28, axier 12 and lifter 27. Tangenter 28 has rollers 40 paraxial with directions 18. Tangenter 28 is therefore inherently motionally rigid in directions 18 and derives rigidity in directions 20 by exothermal means. Axier 12, comprised of electrodeformable material, such as ferroelectric or piezoelectric material layers to form an actuator body portion, is inherently rigid in all directions. Lifter 27 has rollers 32 with motional rigidity in directions 18 while rigidity in directions 20 is derived exothermally. The hybrid actuator of FIG. 28 is most rigid in directions 18, parallel to the axis of the shaft of the example device of FIG. 27.

The positioner of FIG. 27, using the hybrid actuators of FIG. 28 positions axially with relatively large forces. A thermal axier in place of the piezoelectric one shown, would have rolling components perpendicular to direction 18 and would therefore may be relatively compliant in direction 18. The hybrid actuator embodiment of FIG. 28 illustrates one acting layer for each axis of motion. Other variants (not illustrated) may have two or more layers acting for each actuator portion motional direction.

Figure 21:
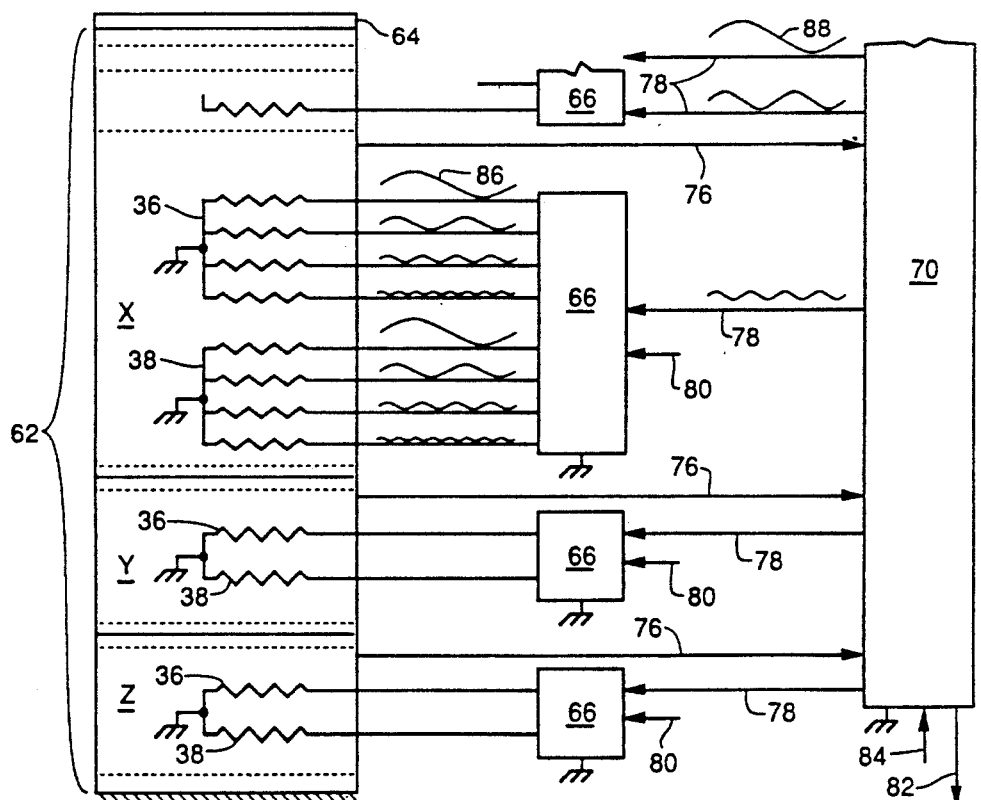
FIG. 21 is a schematic actuator system diagram using a preferred electric drive means.

Referring to FIG. 21, shown is a schematic diagram of a control means comprising controller 70, power distributors 66 and a typical three-axis expansion actuator 62. Actuator activation instructions and electric power enter controller 70 by port 84. Actuator system status messages are externalized by port 82. Main Electric power enters power distributors 66 from an external source by ports 80. The system contains one or more actuators, one of which is illustrated for clarity. Each actuator 62 schematically comprises integral actuator body portions X, Y and Z. Each actuator portion further comprises at least one layer. Layers are schematically separated by dashed lines. Each portion is illustrated to have at least one dual circuit heater 36, 38 (portion Y). Each heater further comprises multiple conductors, 36 and 38 (portion X), only one heater being illustrated with such detail for clarity.

In operation, operating instructions of port 84 cause controller 70 to calculate and send actuator control signals to electric power distributors 66 by connections 18. Connections 18 may consist of two or more separate circuits carrying related but distinct control signal information, for example sinusoidal excitations 88. Distributors 66, using a combination of control signals 88 and input power 80, drive the heater circuits of the actuator. Separate conductors of a layer's heaters are excited with separate sinusoidal wave forms, for example 86, only one heater being detailed in the interest of figure clarity. It is to be understood that actuators of the present invention comprise any combination of body portions, layers, heaters, and multiple heater conductors, any combination of which may be separately, and alternatively in groups, independently electrically activated.

An alternate embodiment of the present invention incorporates one or more sensors adjunct to one or more actuator body portions that send motional and force information to controller 70 by connections Controller 70 compares actuator motional information 76 with actuator activation information 84, then adjusts activating signals 78 until signals 76 and 84 agree.

Preferred activation of actuators causes pairs of actuators to alternately walk to forcefully move the positioned object. Walking is defined as a coordinated activation in each actuator having a lifter and tangenter in a manner very like common bipedal walking. Smooth walking is defined as tractive forceful positioning of an object without rubbing such that both speed and force are uninterrupted and smooth. Thus the actuator engages the object while moving at the same speed, thereby eliminating rubbing friction. Non-sinusoidal motional wave forms obtain in the output components of each smooth walking actuator.

The present invention is intended to be used with varying degrees of smooth walking. Rough walking is defined as tractive positioning of an object with a predetermined amount of sliding and a predetermined amount of applied force variability. These alternative modes of activation are achieved with motional wave forms that differ from those used for smooth walking. Rough walking uses any mechanical walking wave form commensurate with the desired life of the traction surfaces. Concessions are required as to the degree of variability of force applied to the positioned object. Particular rough walking applications may also relax limits for acoustic noise level and elastic excitation of the positioned object.

Rough walking is used in a diverse class of actuator applications that require simple electrical drive circuits, relatively simple actuator construction, and in which lower mechanical and electrical efficiencies are acceptable. An example of this class is a linear actuator that replaces an hydraulic cylinder that makes relatively few strokes during its useful life but must apply a relatively large force.

Lifter embodiments described apply a lifter force when heaters are pulsed. A variant of the actuator (not illustrated) has full quiescent lifter force applied, and removal of lifter force when heaters are pulsed, also known as fail locked. Fail locked actuators preclude the use of redundant actuator sets positioning a common shaft, but eliminate ancillary return force springs or locking mechanisms in some applications. Fail locked actuators serve as hydraulic cylinder replacements when duty calls for holding a position against a relatively large force most of the time. Forceful position holding without current flow greatly ameliorates if not obviates cooling requirements.

The present actuator makes relatively short power strokes. However, power strokes of walking expansion actuators may easily exceed those of comparable piezoelectric actuators by at least an order of magnitude because the latter type of actuators limit stroke in accordance with elastic strain limitations above which fatigue or rupture is assured. Given a stroking frequency, the surface speed attained by the walking expansion actuator will exceed that of the equivalent piezoelectric actuator by the same order of magnitude.

The nature of traction requires that the lifter apply a normal force that is greater than the largest tangential force by the same factor as the inverse of the rolling or translating static coefficient of traction contact friction. In a diverse class of actuator applications the normal force is relatively high, certainly much higher than that supplied by the mere weight of the apparatus, and commonly larger than can be supplied by practical springs. Therefore the preferred actuator lifter supplies all necessary tractive normal force rather than external exigencies such as springs or gravity. Gravity is not essential to described function, allowing zero- and micro-gee operation a priori.

Actuators operating with relatively high mechanical efficiency require complete clearance between the traction member and the surface of the positioned object during retrace. Actuators without springs or internal compressive forces therefore have relatively little control of body layer thickness during retrace. When the actuator body is essentially free in a direction perpendicular to the broad surfaces of the layer sheets, some residual retrace rubbing may occur. Also traction between layer rolling components and sheet surfaces requires a predetermined compressive force to maintain traction. Retrace rubbing is avoided by applying a permanent normal compressive force to the actuator body. Embodiments of the actuator not having inherent compression use tension links rotatably or flexurally attached between the edges of the traction member and the support means to which the actuator body is attached. Tension members supply the necessary body compression needed to avoid rubbing during retrace. Flexible members that confine the expansive material also serve to compress layers. Tension links include embodiments having interlayer edge seals.

Tension links are aligned parallel to, or at a small angle to the lifter action direction, and therefore provide essentially complete mechanical compliance to tangenter and axier motions. Essentially infinite tangential compliance of the tension links detracts insignificantly from tangenter or axier power conversion. A link spring-constant is predetermined to supply sufficient body compression for tractive operation while not significantly increasing lifter work.

Preferred lifter layers are planar because the preponderance of applications require linear lifter action. However, the more compact rotary actuators use curved lifter and tangenter layers to conserve space.

The example motor application illustrated in FIG. 2 has actuators comprised of fixed-base lifters supporting tangenters. As the lifter applies tractive normal force it must also move the attached tangenter and traction member portions, while sustaining all tangenter forces. Proper motor function requires lifters having relatively large structural rigidity in the direction of tangenter forcing. The preferred direction of lifter rollers is therefore parallel to the direction of tangenter forced motion. In example FIG. 3 lifter rolling components lie parallel to direction 26.

Three-axis actuator applications such as example FIG. 2 but with lifter, tangenter and axier, have lifter rollers (in some embodiments) parallel to at least the tangenter or the axier. In three-axis applications, layer stiffness is attained by alternating bidirectional expansive forces rather than externally applied restoring forces. Inherent stiffness due to controlled activation is more efficient, requiring less work from expansion material to overcome an external restoring force. Relatively high stiffness obtains through accurate timing of heat pulses and through the waveform of each pulse. The actuating pressure applied to layer members is a complex function of expansive material thermophysical properties, heat source and cell geometry, electric pulse waveform, duty cycle, and operating energy density.

The present walking actuator also derives higher mechanical efficiency when elastic compliances of all device portions are lower. Any actuator compliance relegates a portion of each forcing stroke to elastic deformation. The actuator body, the positioned object, and the actuator support means are all subject to stroke-reducing deformation. High structural rigidity conserves the mechanical power delivered to a positioned object, given a particular set of operating conditions.

The contact between a rolling component and a sheet is a line contact rather than a Hertzian contact. A Hertzian contact is defined as that which has a point-like contact area, such as occurs when a sphere is pressed onto a plane surface, typified by ball bearings. The mechanical rigidity of a Hertzian contact increases by an exponential function of normal force. Relatively low rigidity obtains at low contact force, and increases rapidly to higher values at higher normal contact forces. At a normal force sufficient for desirably high contact stiffness, the compressive and shear stresses of the Hertzian contact just interior to the contacting bodies may exceed allowable limits imposed by component strength. Operation at or above safe stress levels causes gradual if not catastrophic destruction of the contact surfaces, failure occurring first just interior to the surface, then leading to surface eruption of fragments.

Each contact of the walking actuator, including roller-sheet contacts and the contacts between traction members and positioned object, is at least a non-Hertzian line-area contact having an elastic stiffness that is essentially independent of the normal load. A prescribed normal line load engenders relatively low compressive and shear stresses in the vicinity of the contacts. The multiplicity of rolling cylindroid-plane contacts of the actuator provides relatively large load carrying capacity. The combined areas of contact of actuator rollers are generally sufficient to limit contact stresses below the so-called threshold fatigue value.

Normal force during actuator walking is relatively high, and two alternately acting actuator pairs are used for most practical applications in which the positioned object is held in a vise-like grip at all times. Two sets of three traction members provide kinematic stability for most object shapes. The vise-like grip of one set is replaced by the grip of the other set while normal walking proceeds. The positioned object is never free of support. Gripping traction members satisfy the requirements of and obviate the need for conventional bearings. Conventional bearings, either rolling element or fluid film, have finite clearances, high structural compliance relative to gripping traction members, and have well known wear mechanisms. Actuator gripping traction members behave as zero-clearance bearings with rigidity approaching that of a monolithic structure. Smooth walking precludes rubbing.

The actuators have robust construction commensurate with the relatively large operating forces employed. The robustness of construction in combination with the rigid bearing-function of walking provides structural stiffness that allows relatively high positioning precision. Most prior art positioning devices position no more precisely than allowed by internal or ancillary position sensors. Such other positioners generally rely on bearings and linkages, allowing an arbitrarily precise position sensor to compensate only in part for bearing, linkage and elastic compliances, therefore achieving at best a fraction of the possible precision afforded by a position sensor. Device compliance is more important in dynamic positioning control in which compliance reduces control bandwidth, which in turn reduces positioning accuracy.

Large actuators use discrete component heaters made of wire or foil. Multiple fine wires in electrical parallel are volumetrically distributed to increase heat transfer from the heater to the expansive material. Multiconductor heaters allow independently electrically activated conducting parts. Ribbons and foils also have an advantageously large heat transfer area while being easy to handle relative to multi-strand wire.

Coiled coil heaters similar to lamp filaments are used because of their advantageously high surface area to volume ratio. The coiled (smaller) coils have greater diameter than those used in lamps as an aid to heat transfer. Pulse repetition rate depends in a complex manner on material electrothermal properties and on geometry. Moderate sized actuators having foils and ribbons allow pulse repetition rates of hundreds of Hz, while lamp-like filaments and multiconductor wire heaters cycle at kHz rates. Heaters made by microscopic machining methods, for example see "Integrated-Circuit Broadband Infrared Sources", NASA Tech Briefs, March 1989, p 32 and C. Spencer, "Gas Flow Sensor Fabricated on Silicon Chip", Electronic Products Mag. 1 Oct., 1984, p. 29, pulse at tens to thousands of kHz rates.

Supports (omitted in figures for clarity) for long heaters are as sparse and slender as is appropriate for a particular application in order to reduce the detrimental effects of cold spots. Properly heated fluid expansive material rushes toward cold spots during a heating pulse, thereby reducing the average pulsatile pressure achieved by the actuator, given particular operating conditions. One terminus of each heater element is electrically connected to a common ground to simplify wiring in some applications. Other applications use both terminuses of heater conductors when electrical loops are formed such as in resonant circuits.

Expansive materials include at least solids, liquids, gasses, subliming solids and vaporizing liquids (two-phase materials). Solids and liquids are used in embodiments such as the configuration of FIG. 19 in which volumetric compression of material does not occur. Relatively expansive solids include polyethylene, silicone rubber, synthetic rubbers, and waxes. Denser and stronger solids include metals such as zinc, magnesium, and aluminum. Metals have relatively high thermal conductivity, an advantage during heater cooling cycle portions, but a disadvantage during increasing temperature cycle portions. Some single crystals are anisotropic, having relatively high thermal expansion in one lattice direction that allows orienting the crystals in a direction advantageous to pulsatile heater cycling. Layered pyrolytic graphite is highly isotropic and sublimes directly from solid to gas over a wide range pressures.

Air is used for convenience in a diverse class of applications. Many gasses have thermophysical properties sufficiently better than air to warrant their use despite the complexity added to actuator construction by gas confinement portions. At cryogenic temperatures of a few Kelvins helium gas is the preferred fluid. In the range of 10 to 30 Kelvins the relatively high speed of sound through hydrogen is advantageous, particularly when materials having excellent resistance to hydrogen embrittlement are used for device construction. At other cryogenic temperatures between 30 K. and room temperature, preferred fluids, in order of operating temperature, include at least neon, argon, methane, nitrogen, ammonia and carbon dioxide.

Dual phase materials such as liquids that change to vapor at or near the desired average operating temperature of an actuator offer a relatively large expansive force per unit of heating energy. The change in volume from liquid to vapor is about three orders of magnitude. Numerous organic liquids are available that provide almost any combination of operating temperature and vapor pressure. Inorganic liquids having roughly spherical molecules with essentially filled outer electron bands, such as per-halocarbons, have thermophysical properties appropriate to pulsatile heater operation. Example liquids include at least chlorocarbons, fluorocarbons, perfluorocarbons, chlorofluorocarbons, various members of the family know by the trademark of Freon, and nitrogen oxides. Members of this class of compounds having relatively little chemical reactivity usually provide an advantageously wide range of temperature between the normal boiling temperature and the melting temperature. Preferred liquids have low heats of vaporization. Particular values of thermal diffusion coefficient and heat conductivity of an expansive material influence the ratio of heater surface area, expansion volume, and cycling time. A high diffusion coefficient spreads heat rapidly, allowing a relatively greater portion of material to be heated, and allows more rapid cooling. High thermal conductivity provides more rapid cycling in cycles where cooling is otherwise a speed limitation. Heat of vaporization in combination with enthalpy of the expansive material influence the effectiveness of heater-expander operation. Low values of heat of vaporization use less energy to affect a desired temperature change.

Pulse peak pressure increases with decreasing volume of expansion material. Embodiments such as those of FIGS. 6 and 10, fill most of the volume with components, leaving just enough space for reliable heater operation. A small expansion volume allows more rapid cycling because there is relatively less expansion material to heat. Rapid cycling also results from more rapid cooling after a heating pulse. Cooling depends on the rate of heat transport out of the expansion material. The rate of heat transport is a sensitive function of the surface area to volume ratio of the expansion chamber. This ratio increases dramatically with decreasing expansion volume. Of two actuators enclosing similar volumes of expansion material, the actuator having the greatest degree of expansion material subdivision provides the shortest cycle time.

Heater surfaces may be made porous, and heaters bodies are themselves made of porous materials, to increase the surface area in contact with the expansive fluid (or condensed non-liquid). Porous materials including at least charcoal and ceramics known under the trademark Zeolite, are tailored by selected processes to have pores sized to preferentially adsorb (absorb on and in the surface) a portion of the expansive material. During the heating pulse, the expansive material intimately contacting the porous heater will be desorbed, expanded and thus increase pressure more quickly, when compared with the time taken by a similar volume of expansive material not benefiting from porous structures and that depends in part on its own thermal transmissibility to respond to a pulse of heat.

Light duty actuator operation allows heat to escape from layers by sheet conduction without ancillary cooling. Alternatively an actuator may have an energy density of operation that depends on cooling to restrict the operating temperature to a predetermined maximum. Each embodiment of the present invention may incorporate forced convection cooling to allow increased operating energy density without thermal damage.

The effective operating actuator energy density is increased when internal heat is rapidly removed. Each heating pulse, given a peak temperature, produces proportionately more power when heating commences with expansion material at a lower temperature. Forced cooling is affected by fluid flow through inter-component spaces. Heat is more quickly removed from myriad minified components because of the relatively large ratio of surface area to volume.

High energy density operation in macroscopic actuator embodiments have fluid channels (FIG. 19). internal to any combination of sheets, rollers and barriers. Maximum energy density obtains when all actuator components have internal cooling channels.

Embodiments having cooling fluid supplied to and removed from internal channels by tubing operate in a vacuum without cooling fluid loss. Internal cooling microchannels increase the energy density in minified actuator embodiments and are included in the scope of the present invention.

Another method of cooling is by passing coolant around the heaters. A disadvantage of this interconductor cooling is exposure of all roller and sheet traction surfaces to the coolant. Preferred forced convection interconductor cooling fluids are gasses and liquids that are not lubricants. Liquids customarily used to lubricate and cool industrial traction machines, such as smoothly variable traction speed transmissions, are insufficiently tractive to operate satisfactorily in the preferred embodiments of the present invention.

Alternate embodiments of the present invention have as a substitution for heat pipes, wicks which are appropriately placed to suit relatively high energy density actuator operation. The wick embodiment of FIG. 20 creates a larger vapor volume and commensurate change in pressure than obtained by merely heating an equivalent of gas. After the heat pulse, some vapor recondenses to liquid in the wick, while excess heat passes as vapor to sheet edges or other cool portions for recondensation by the forced convection cooling channel wicks. The state change embodiment of the present invention necessarily entails a more restricted range of operating temperatures relative to gaseous materials. Properly operating heat pipes maintain a temperature that is nearly independent of the amount of heat being transferred. The mass flow of vapor is essentially proportional to the rate of heat transfer (when heat source and sink are separated).

The rotary application example of FIG. 2 shows planar layers for clarity. Preferred layers that position through a circular arc segment are curved (see FIGS. 23-28). Curved layers allow traction over the entire traction member contact surface rather than at a rolling line contact at a central portion. Traction with full contact and circular tangenter motion is therefore not rolling is paired traction translation. Even the small amount of microrubbing associated with cylinder rolling is therefore eliminated.

Embodiments having relatively large traction member contact surfaces have a gridwork of shallow grooves (not illustrated), analogous to rain tire grooves, permitting egress of fluids (if present) during high speed lifter activation. Grooves are also used in traction members of actuators satisfying applications requiring relatively frequent walking steps in the presence of air or other gasses, for example, several thousand steps per second, lest well fitting surfaces behave as gas bearings instead of traction members.

A life-shortening mechanism is cyclical stress at contacts. However, unidirectional cyclical stress, as occurs on the traction member, is well known to contribute relatively little to traction surface degradation due to fatigue.

During assembly of actuators, rollers are retained and located until layer compressive forces are applied. Means of roller retention are omitted from figures for clarity. Embodiments of the present actuator apply a compliant substance (not shown in figures) to a portion of the space between rollers and barriers for roller stability and retention. Example stabilizing substances are polymers with predetermined degrees of mechanical compliance such as silicone rubbers and rubbery linear polymers. Polymers that are applied in the vapor phase, such as poly-paraxylylene, are preferred for microscopic embodiments. Heat pipe actuator embodiments may use an extended wick portion for roller stabilization.

Alternatively, rollers are retained and trapped by extensions (not illustrated) of sheets or barriers. Extensions confine and stabilize rollers without interfering with movement. Extensions are preferably integrally fabricated, particularly in microscopically fabricated layers. Retaining extensions are advantageously made of materials that are more tolerant of inhospitable environments, such as radiation or high temperature, than retainers of organic additions. It should be evident that, unlike common mechanisms, motions of components of the walking expansion actuator are cyclical and small, requiring relatively little strain of roller retention and stabilization means. A benefit of small cyclic motions of rollers is the gradual reduction of rolling friction with continued use because surface asperities are repeatedly flattened without relative lateral dislocation.

When electrically conducting materials are use to construct actuator components, internal surfaces near heaters are rendered electrically non-conductive by predetermined surface treatments, preferably in situ ceramic metal oxide coatings and the like. In situ metal oxides have relatively high tractive contact durability and tolerate higher temperatures than organic films. The preferred insulation for aluminum is deep anodizing, generally having an oxide coating thickness of approximately 7.6 $\mu$m.

Macroscopic components are preferred when the present invention is enlarged to relatively large size, such as prime movers for heavy vehicles, marine vessels, hydraulic cylinder replacements and the like. Macroscopic variants of actuators are easily made of ordinary wire and sheets of appropriate material. Specially shaped rollers and barriers other than round are more easily cast, drawn or rolled by dies of the appropriate configuration.

The apparent strength of mechanical components increases with minification. As previously discussed, pulsatile operation proceeds more briskly in subdivided layers. Despite a relatively larger ratio of surface area to volume in miniature components, there is less surface area in which to find minute flaws that contribute to material weakness. An extreme example is a component made of a single crystal having relatively few lattice defects.

The preferred method of fabricating small, miniature and microscopic embodiments of the present invention forms relatively small actuator components by one or more techniques of microminiature manufacturing., such as epitaxial deposition, photolithography, chemical etching and related processes. Actuator efficiency increases with component minification due to the previously described relations. Small component dimensions permit a larger number of components in a given layer area, thereby adding a larger number of force contributions to the mechanical stroke. More closely spaced components also increase bidirectional motion actuator stiffness through closer electromechanical coupling.

An actuator layer or group of layers is electrically connected together and driven by a single time-varying electrical source, such as a class A power amplifier, a switcher-regulator using a direct current source, and the like. Such drive means allow tailoring of the electrical waveform in a manner suitable to producing a predetermined layer or layer group position and force as a function of time. Ordinary pulse circuits are used in embodiments for applications benefiting relatively little from tailored force-position wave forms. Bidirectional dual circuit layers may be alternately driven by the same electrical source, the switching timed as applied currents change polarity to minimize current during switching.

Actuator force and position are relatively complex functions of applied current and time, and are in general nonlinear. The change of pressure with time during an electrical heating pulse is nonlinear because of thermal gradients in the expansive material and because of Newton's law of cooling. Forceful motion of actuator layers with sinusoidal wave forms facilitates Fourier synthesis.

The preferred drive method for the present invention is Fourier synthesis which is the subject of applicant's copending application Ser. No. 07/488,548 filed Mar. 5, 1990 incorporated here by reference. Simply, multiple electric signals are multiply transduced by portions of an actuator. The actions of the actuator are then summed. Conventional Fourier electrical circuits electrically add multiple sinusoidal electrical signals to achieve a non-sinusoidal electrical wave form. The present invention is distinct from conventional Fourier circuits in that an electrical sum appears nowhere in the system, but actuator actions are summed mechanically (layers) and thermally (heaters) to produce a non-sinusoidal transduced waveform. Sinusoidal layer wave forms facilitate mechanical Fourier summing of layer forceful strokes to provide a non-sinusoidal whole-actuator output, while Fourier thermal summing of nonlinear actions provides sinusoidal layer forceful strokes.

For a diverse class of applications of the present actuator, layers are required to produce sinusoidal forceful stroke wave forms. The transduction from heater current to mechanical stroke is complex and generally nonlinear, as previously described. Therefore, each conductor of a multiconductor heater is stimulated with a separate sinusoidal signal having amplitude, phase, polarity and frequency determined by Fourier rules for the forceful stroke sinusoidal wave form desired. The forceful stroke sinusoidal wave form desired is therefore the thermal sum of the contributions of each heater segment.

Although each segment of a multiconductor heater can lie in a separate cell of expansion material, preferred embodiments place a similar multiconductor heater in every cell of a layer. The coupling between intensely heated and less intensely heated portions of expansion material is a second order effect that is accommodated by modifications of the Fourier synthesis process.

The sinusoidal forceful stroke contributions of layers, each layer having amplitude, phase, polarity and frequency determined by Fourier rules for the forceful stroke non-sinusoidal wave form desired for the traction member of the actuator, are mechanically summed.

Embodiments of heater having multiple segments in electrical parallel provide a relatively low electrical resistance. When a low resistance heater or set of heaters is included in a loop including a respective portion of an electrical distribution means (66 of FIG. 21), a resonance is stimulated in the loop. For electrical resonance stimulation, the distribution means incorporates energy storage electric components such as combinations of capacitances and inductances. The quality factor or Q of the resonant circuit is primarily determined by the heater resistance. Q increases with decreasing resistance. The resonance thus achieved is predominantly electrical, not mechanical. Elastic resonance is not used in the present invention to achieve the described objects. A benefit of electrical resonance stimulation of heater loops is the multiplicity of methods of stimulation. The application of an input power pulse on the rising half cycle of each loop voltage swing results in stimulation. The shape of the input power pulse is less important than pulse timing and energy content. Loops are relatively easily configured to permit stimulation by a variety of input power arrangements, for example, high voltage at low current, low voltage at high current, switched DC or AC and the like.

A benefit of Fourier synthesis for expansion actuators is the control of action. The product of tangential force and tangenter stroke length per unit time is a measure of the mechanical power applied to the positioned object. Fourier synthesis permits smooth walking by employing a symmetric notched triangle tangenter waveform. A triangle waveform is synthesized by summing the forceful strokes of some tangenter layers that follow sine forms and other tangenter layers that follow cosines. Since layers are independently electrically activated, Fourier synthesis allows control of tangential force applied by the actuator by varying the amplitudes of cosine layers. Similarly, varying the sine layer amplitudes controls the tangential speed of actuation. Speed and force are simultaneously independently controllable.

Preferred distributor components of the present invention, for example 66 of FIG. 21, are located on layer sheets. Miniature embodiments of the present actuators benefit from sheet-mounted components, particularly when an extension of a microminiature manufacturing process also constructs the components. The same fabrication processes construct electrical interconnections between heater segments and empowering devices. Cooled sheets also cool sheet-mounted control components.

A variant motor application (not illustrated) of the present invention uses one of the described two-circuit tangenter portions as a tangenter and a similar two-circuit tangenter portion as a lifter. This motor application has a disk-like rotor with tractive normal forces applied axially (or at a small angle to the axis in the variant having a beveled disk edge). The benefit of using a bidirectional tangenter as a lifter is that the lifter stroke, done by a tangenter, does not mechanically rectify the heater pulse. Two-circuit bidirectional tangenter drive of all actuator portions simplifies implementation of Fourier stimulation. Embodiments of the present invention need not include the use of conducting materials other than for heater circuits. Losses to eddy currents are therefore avoided. The use of nonmagnetic materials also allows operation even during immersion of an actuator in an intense external magnetic field.

The use of actuator construction materials having low atomic number allows relatively reliable and persistent operation in environments of intense ionizing radiation. Low atomic number materials also evince relatively little transmutation to long-lived and dangerous isotopes. Described embodiments using low density sheets, for example, light alloys or composites, allow construction of relatively light actuators. Light weight devices fill applications having relatively high transportation costs such as orbiting space stations and the like. The present actuator relies in part on traction for proper function of both rolling components and for the traction member. Lubricants are not used, and in fact would degrade actuator performance by lowering available tractive forces. Therefore the unlubricated actuator operates well in vacuum, in space, and in a wide variety of other relatively hostile environments when expansive materials are sealed in the actuator body. Absence of lubricants allows vacuum operation without contamination, a benefit in applications such as clean rooms and in vacuum deposition apparatus. Embodiments using only gas for expansion entail a lesser risk to an operating environment in the event of a leak.

In summary, the walking expansion actuator constitutes a novel class of prime movers offering large multi-axis forces, moderate speeds, good rigidity and precision of positioning, high electrical efficiency, high mechanical efficiency, very broad operating temperature range, and long life. Primary anticipated applications are vehicles, planetary exploration vehicles, positioners for aircraft components and robotics.

I claim:

1. An actuator comprising:
   a stationary sheet;
   a translatable sheet opposite the stationary sheet;
   a rolling barrier, having rolling contact with the stationary sheet and the translatable sheet, for moving one sheet relative to the other;
   a fixed barrier attached to the stationary sheet, and extending to a point proximate the translatable sheet, and;
   two end walls, said stationary sheet, translatable sheet, rolling barrier, fixed barrier, and end walls, forming the boundaries of a chamber;
   a heat source in the chamber;
   a thermoexpansive material in the chamber;
   a means of activating the heat source to provide an exobaric pulse in the thermoexpansive material, which expands in the chamber, forcing the rolling barrier to translate the translatable sheet relative the stationary sheet by rolling contact with the sheets.

2. An actuator as in claim 1 wherein
   said rolling barrier translates the translatable sheet parallel to the stationary sheet to form a tangenter.

3. An actuator as in claim 1 wherein
   said rolling barrier translates the translatable sheet normal to the stationary sheet to form a lifter.

4. An actuator as in claim 2 wherein there is a chamber having a heat source and thermoexpansive material on both sides of the rolling barrier so that the translatable sheet is translated in opposing directions by activating the heat source on one side of the rolling barrier or the other.

5. An actuator as in claim 4 wherein there is a gap between the fixed barrier and the translatable sheet.

6. An actuator as in claim 5 wherein the rolling barrier is a cylinder.

7. An actuator as in claim 5 wherein the rolling barrier has a rectangular cross sectional shape on three sides, having two flat side portions, and a flat bottom portion, which rests on and pivots on a cylindroidally convex portion of the stationary sheet, the rolling barrier having a top portion which is cylindroidally convex for engaging the translatable sheet.

8. An actuator as in claim 5 wherein the rolling barrier and the fixed barrier are adjacent to each other, the barriers having overlapping cycloidal sealing surfaces and having cycloidic concave portions which form the chamber containing the heating source and the thermoexpansive material.

9. An actuator as in claim 3 wherein the rolling barrier comprises two bars, one disposed on top of the other, the bars having convex cylindroidal curvatures on their top and bottom surfaces, such that the sheets will be moved apart when the bars are displaced by an exobaric pulse.

10. An actuator as in claim 3 wherein the rolling barrier comprises two bars, one disposed on top of the other, the bars having convex cylindroidal curvatures on their top portions and flat bottom portions the lower of which rests on and can pivot on a cylindroidally convex portion of the stationary sheet, such that the sheets will be moved apart when the bars are displaced by an exobaric pulse.

11. An actuator as in claim 9 wherein the fixed barrier is replaced by a second rolling barrier.

12. An actuator as in claim 10 wherein the fixed barrier is replaced by a second rolling barrier.

13. An actuator as in claim 11 wherein there is a heating source and thermoexpansive material between every other rolling barrier.

14. An actuator as in claim 11 wherein there is a heating source and thermoexpansive material between every rolling barrier so that the rolling barriers are disposed in opposite directions by exobaric pulses by alternate activation of heater sources to lift or lower the translatable sheet.

15. An actuator as in claim 12 wherein there is a heating source and thermoexpansive material between every other rolling barrier.

16. An actuator as in claim 12 wherein there is a heating source and thermoexpansive material between every rolling barrier so that the rolling barriers are disposed in opposite directions by exobaric pulses by alternate activation of heater sources to lift or lower the translatable sheet.

17. A lifter actuator comprising at least one chamber having a heat source and thermoexpansive liquid therein, said chamber comprising a stationary sheet and a translatable sheet each sheet having overlapping adjacent extensions which are insertable into each other and with the sheets form said chambers,
   the heat source has a wick which is immersed in the thermoexpansive liquid, wherein a heat pulse from the heater changes the liquid to a vapor,
   a means of activating the heat source to provide an exobaric pulse in the thermoexpansive liquid which expands, forcing the sheets to move apart.

18. An actuator as in claim 17 wherein the sheets have cooling channels for a cooling fluid to flow through and cool the sheet.

19. An actuator as in claim 1 wherein, a plurality of actuators are layered to form an actuator stack,
   where each layer comprises the stationary sheet, the translatable sheet, and the rolling barrier, the fixed barrier and heat source located between the sheets.

20. An actuator as in claim 19 where the actuator stack has at least two layers, wherein when layers are attached in the stack there is a first layer and a second layer adjacent to the first layer, where the stationary sheet of the first layer is attached to the translatable sheet of the second layer.

21. An actuator as in claim 19 where the actuator stack has at least two layers, wherein when layers are attached in the stack there is a first layer and a second layer adjacent to the first layer, where each sheet doubles as the fixed sheet of the first layer and as the translatable sheet for the second layer.

22. An actuator as in claim 19 where there is a stack of tangenters for tangential movement of an object.

23. An actuator as in claim 19 where there is a stack of lifters.

24. An actuator as in claim 19 wherein there is a stack having a first end and a second end composed of tangenter layers and lifter layers said stack attached to a housing on the first end and having a traction surface attached on the second end for engaging the surface of an object.

25. An actuator as in claim 24 wherein there are axier layers, the tangenter layers and axier layers are angled to one another.

26. An actuator as in claim 24 wherein there is a first set of at least two stacks of actuators simultaneously contacting the surface of an object to hold and move said object at any one time and a second set of at least two stacks of actuators positioned to alternately contact the surface of an object to hold and move said object when the first set is no longer in contact with the object.

27. An actuator as in claim 26 wherein the actuators move the object by smooth walking motion.

28. An actuator as in claim 1 wherein the heat source is an electrical heating element.

29. An actuator as in claim 1 wherein the heat source is a chemoelectric reaction.

30. An actuator as in claim 29 wherein catalytic coatings are used in the chamber.

31. An actuator as in claim 30 wherein there is a means of introducing chemoelectric material into the chamber and exhausting the waste product of the chemical reaction.

32. An actuator as in claim 1 wherein there are cooling channels in the sheets.

33. An actuator as in claim 24 wherein the heat source is controlled by a controller which sends electrical signals to each chamber in the layers, said signals are different for each layer such that the mechanical Fourier summing of the layers results in a predetermined desired movement of the actuator stack.

34. An actuator as in claim 33 wherein there are motion and force sensors in the actuator stack for providing information about the actuators position to the controller.

35. An actuator as in claim 2 wherein the sheets are flat.

36. An actuator as in claim 3 wherein the sheets are flat.

37. An actuator as in claim 2 wherein the sheets are curved.

38. An actuator as in claim 3 wherein the sheets are curved.

39. An actuator as in claim 22 wherein the sheets are flat.

40. An actuator as in claim 23 wherein the sheets are flat.

41. An actuator as in claim 22 wherein the sheets are curved.

42. An actuator as in claim 23 wherein the sheets are curved.

43. An actuator as in claim 19 wherein at least one layer in the stack is a piezoelectric layer.

44. An actuator as in claim 19 wherein at least one layer in the stack is an electrodeformable layer.

* * * * *

UNITED STATES PATENT AND TRADEMARK OFFICE
CERTIFICATE OF CORRECTION

PATENT NO. : 5,327,038
DATED : July 5, 1994
INVENTOR(S) : Gordon W. Culp

It is certified that error appears in the above-identified patent and that said Letters Patent is hereby corrected as shown below:

Column 22, line 11: Delete "can pivot" and insert "pivots".

Signed and Sealed this

Eleventh Day of October, 1994

Attest:

BRUCE LEHMAN

*Attesting Officer*     *Commissioner of Patents and Trademarks*